W. L. STEFFENS.

PIPE COVERING SYSTEM.

APPLICATION FILED MAY 21, 1919.

Reissued Oct. 26, 1920.

14,970.

INVENTOR

Walter L. Steffens,

BY

Kenyon & Kenyon his ATTORNEYS

UNITED STATES PATENT OFFICE.

WALTER L. STEFFENS, OF CINCINNATI, OHIO, ASSIGNOR TO THE PHILIP CAREY MANUFACTURING COMPANY, OF LOCKLAND, OHIO, A CORPORATION OF OHIO.

PIPE-COVERING SYSTEM.

14,970. Specification of Reissued Letters Patent. Reissued Oct. 26, 1920.

Original No. 1,227,087, dated May 22, 1917, Serial No. 44,344, filed August 7, 1915. Application for reissue filed May 21, 1919. Serial No. 298,795.

*To all whom it may concern:*

Be it known that I, WALTER L. STEFFENS, a citizen of the United States, and a resident of Wyoming, (formerly of Hartwell,) Cincinnati, in the county of Hamilton and State of Ohio, have invented certain new and useful Improvements in Pipe-Covering Systems, of which the following is a specification.

My invention relates to pipe-line installations and coverings therefor; and its object is to provide the pipe with simple and readily installed means to afford a maximum degree of covering or insulation.

My invention consists in the combination of parts and in the details of construction and arrangement of parts as will herein be more fully described and claimed.

Figure 1:
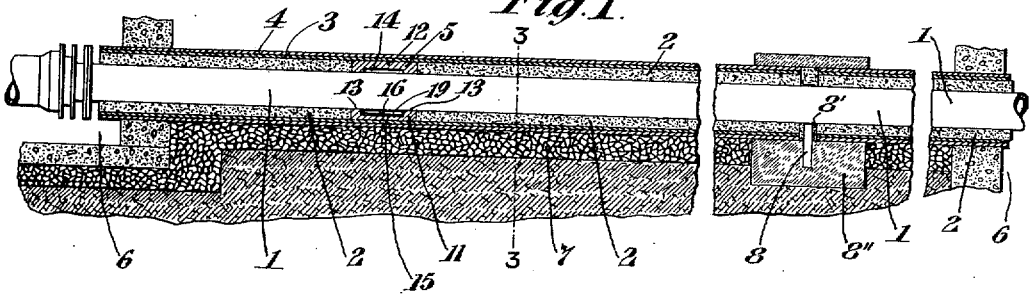
Figure 1 is a vertical longitudinal section of part of a pipe-line installation embodying my invention, intermediate parts being omitted for lack of space.
Figure 2:
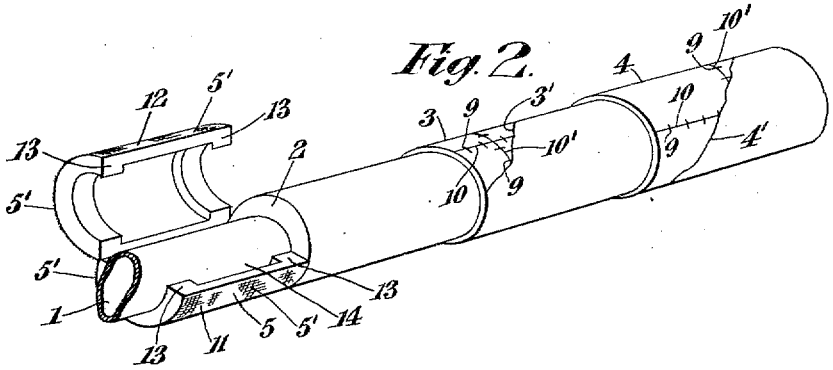
Fig. 2 is a detail perspective view of a pipe and its mounting and coverings according to my invention, parts of the various elements being broken away to reveal the elements underlying.
Figure 3:
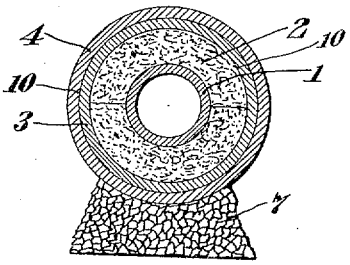
Fig. 3 is a vertical cross section on the line 3—3 of Fig. 1, enlarged.

My improved system includes a covering for the pipe 1 consisting of suitable insulating material 2 applied directly to the exterior of the pipe and entirely surrounding it, this material preferably being 85% basic magnesium carbonate, and preferably being in sections of convenient lengths. As I construct my invention these sections are in three foot lengths.

The insulating covering 2 is in turn surrounded by a shell 3, surrounding which is a final outer shell 4. These shells provide a protective covering for the insulating material 2.

At suitable intervals, preferably every five lengths of the covering 2 or every fifteen feet, roller supports 5 may be provided, with the insulating cover 2 abutting the support 5 closely at each end, and the shells 3 and 4 extending continuously over the material 2 and the roller supports 5.

As shown in the example herein, the entire structure from one manhole 6 to the next (Fig. 1) is supported upon a drainage bed 7 which may be about six inches in depth, and may be made of broken rock or other suitable material. This drainage bed is laid along the bottom of a properly graded trench, which, when backfilled, incloses the entire structure. The drainage bed may be suitably drained by tile drains to sewers or other points below the level of the trench.

Anchors 8 may be rigidly attached to the pipe at proper points and surrounded by solid blocks of concrete. In such case, the insulating cover 2 and its protective shells 3 and 4 are made to approach the anchor 8 closely at each side, and the unavoidable spaces therebetween are filled with insulating material 8′ similar to that of the covering 2, preferably 85% magnesium cement. The concrete 8″ is then filled around the anchor and adjacent parts of the covering.

From the foregoing it will be observed that the only places where there need be interruptions in the insulating covering and its protective shells from the interior of one manhole 6 to the other, are where these anchors are to be provided, and here the insulating covering is made continuous around the anchor adjacent to the pipe and the entire structure is surrounded by the cement. This is one of the chief advantages of my invention in that there is no effective conducting medium between the pipe itself and the surrounding earth or other material in which it is buried, and the insulating benefits of the covering are realized to a very high degree, without, however, sacrificing any of the necessary provisions for effectively supporting the pipe and providing for its variations in length under varying degrees of heat.

The protective shells 3 and 4 may be made of any suitable material, preferably bituminous fibrous material, such as paper or wool felt impregnated and coated with a bitulithic substance. When made of paper or wool felt, the shell may be made up of a series of layers of the wool felt, preferably being in sections of about three feet each. The internal diameter of the shell of course depends upon the size of the pipe upon which it is to be used, and the thickness of the shell will also depend somewhat upon this. Each of the shells 3 and 4 is preferably split on one side only, and is applied by spreading it open along the split. When the shells are to be applied in this manner, they will be made of material that is resilient enough to readily permit this without breakage.

In installing the system the pipe 1 is preferably blocked up from its permanent support, such as the drainage bed 7, a sufficient distance to allow access all around the pipe, and after the insulating material 2 and roller supports 5 are in place on the pipe, the inner shells 3 are applied by spreading them and slipping them over the exterior of the material 2 and roller supports 5, drawing the shell 3 tight by means of a rope or similar means passed therearound and drawn very tight, as by using it in the form of a tourniquet, and then while the shell is thus held with its edges abutting, suitable permanent fastening means are applied, such as staples 9 driven into the material of the shell across the split, completing a longitudinal seam 10, holding the shell tightly around the material 2. Also, where the succeeding shells abut, staples 9 may complete transverse seams 10′ in the same manner. Then a coat of waterproof cement 3′ may be applied to the outer surface of this first course of shells, after which the shells 4 are applied in the manner such as above described and these are given a final coat of waterproof cement or other waterproofing material 4′ this last coat being amply heavy. In moist or marshy ground it is desirable that this last outer coat be of coal tar pitch.

In applying these shells, both the longitudinal seams 10 and transverse seams 10′ of the respective layers of shells 3 and 4 are "broken" in their relative arrangement, *i. e.* so arranged that they will not coincide. Thus it will be seen that after the two courses of shells 3 and 4 are completed and finished with the waterproof cement or other material inside and out, they will form a practically continuous and impervious waterproof structure around the insulating material 2 and roller supports 5 from one manhole or pit 6 to the next. These shells extend through the walls of the pits 6 along with the pipe.

Each roller support 5 for the purpose of supporting the pipe 1 in such a manner as to leave it free to expand and contract and yet be inclosed by the protective shells 3 and 4, is preferably made up of semi-cylindrical pieces 11 and 12, one of which comes below and the other above the pipe 1, with internal annular flanges 13 at their ends which bear around the pipe 1 and leave, intermediate of them, an annular air space 14 entirely around the pipe 1, the two pieces 11 and 12 meeting snugly at opposite sides of the pipe and thus entirely surrounding it and entirely inclosing the air space 14, while presenting an exteriorly cylindrical formation of about the diameter of the insulating covering 2, and adapted to abut this material 2 squarely at each end and be practically continuous therewith. Preferably this cylindrical roller support is of diameter slightly greater than that of the insulating material 2, so that it fits the protective shell 3 tightly and is thus sure to take the full support of the pipe 1 without leaving any of the weight of the pipe on the insulating material 2 between the succeeding roller supports.

The weight of the pipe 1 is transmitted to the lower piece 11 of the cylinder thus made up through the medium of a metal plate 15 and balls or rollers 16 between it and the pipe 1 (Fig. 1).

The casing or cylinder, made up of the lower and upper pieces 11 and 12, may be made of asbestos in the form of a number of comparatively thin sheets laminated to the required thickness of the walls, and with strips of the same material laminated inside of these at the ends to form the flanges 13, the strips being adhesively secured together by a suitable adhesive adapted to withstand the heat of the pipe, where the pipe is used for conducting steam or other hot substance. Preferably both pieces 11 and 12 are covered and hinged together by a jacket 5′ of textile material.

It is not necessary, however, that the upper piece 12 be as shown, but it may be sufficient to provide the lower piece 11 suitably made up in some such manner as above described, and replace the piece 12 with a semi-cylindrical piece of the insulating cover 2 which, as before stated, is preferably of magneisum carbonate.

The shells 3 and 4, constructed of such material and applied as above described, are tough and elastic, so that their joints are not disturbed nor their waterproof coating cracked or broken under any impacts, as, for instance, those incident to back-filling the trench. Furthermore, such heating and cooling as the protective shells 3 and 4 are subjected to by the pipe 1 does not result in any deterioration of the protective covering, because the shells, made up of suitable material, such as the impregnated or coated fibrous material, are sufficiently flexible to accommodate themselves to all of these changes without having their protective function impaired.

An additional advantage of the entire system is in the lightness of the various parts, especially of the protective shells, so that all of the parts are readily handled without excessive labor, and due to the materials of which they are composed, there is no damage or breakage in handling or in back-filling.

For the larger sizes of pipe, preferably those of more than six inches nominal diameter, it is desirable to provide, under the pipe and its protective covering in the regions of the roller supports, stone slabs or concrete pieces to support the structure better than by the support which is provided throughout the rest of the length of pipe and its covering from one manhole to the other, such as the drainage bed, as hereinbefore described.

Having fully described my invention, what I claim as new and desire to secure by Letters Patent is:

1. In an underground pipe-covering system, in combination with a pipe, an insulating covering therefor and a separate and distinct protective structure around said insulating covering, in the form of resilient cylindrical shells, each longitudinally separated on one side and sprung over said insulating covering and suitably secured together therearound.

2. In an underground pipe-covering system, in combination with the pipe, a friable insulating covering therefor, and a separate and distinct protective structure around said insulating covering, made up of layers of a fibrous material and a bitulithic substance intimately associated and brought into a resilient condition, in the form of longitudinally succeeding cylindrical shells, each longitudinally separated on one side and sprung over said insulating covering and suitably secured together therearound.

3. In an underground pipe-covering system, in combination with the pipe, a friable insulating covering therefor, and a separate and distinct protective structure around said insulating covering, made up of layers of a fibrous material and impregnated and coated with a bitulithic substance and brought into a resilient condition, in the form of longitudinally succeeding cylindrical shells, each longitudinally separated on one side and sprung over said insulating covering and suitably secured together therearound.

4. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting.

5. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting, said shells being coated with a waterproofing material.

6. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting, and a succeeding course of cylindrical shells split and applied around the first mentioned shells as aforesaid, with waterproofing adhesive material between them.

7. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting, and a succeeding course of cylindrical shells split and applied around the first mentioned shells as aforesaid, with waterproofing adhesive material between them, and this outer course being coated with a waterproofing material.

8. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting, a succeeding course of cylindrical shells, split and applied around the first mentioned shells as aforesaid, with waterproofing adhesive material between them, and this outer course being coated with coal tar pitch.

9. In an underground pipe-covering system, in combination with the pipe, and an insulating covering therefor, a protective structure around said insulating cover, said protective covering being in the form of longitudinally succeeding cylindrical shells, each longitudinally separated on one side and sprung over said insulating covering and seamed together therearound along its separation, and with the ends of said shells abutting, a succeeding course of cylindrical shells split and applied around the first mentioned shells as aforesaid, with waterproofing adhesive material between them, the transverse abutting seams and the longitudinal seams of the inner shells being arranged so as not to coincide with the respective seams of the outer shells.

10. In an underground pipe-covering system, in combination with the pipe, and an insulating covering therefor, a protective structure around said insulating cover, an anchor rigidly secured to said protective covering abutting it at opposite sides, insulating material filling the spaces between the anchor and the coverings, and concrete surrounding said anchor and said coverings.

11. In an underground pipe-covering system, in combination with the pipe, and an insulating covering therefor, a protective structure around said insulating cover, an anchor rigidly secured to said pipe with said insulting covering and said protective covering abutting it at opposite sides, insulating material filling the spaces between the anchor and the coverings, concrete surrounding said anchor and said coverings, and supporting means for said pipe under said protective covering at opposite sides of said anchor and the surrounding concrete.

12. A pipe covering comprising an insulating material adapted to entirely surround a pipe, a protective structure around said insulating material in the form of a substantially resilient shell.

13. In a pipe covering comprising an insulating material adapted to surround a pipe, a separate and distinct protective structure, around said insulating material, in the form of a tough, elastic, substantially non-deteriorating shell.

14. In a pipe covering comprising a non-heat conducting material adapted to entirely surround a pipe, a separate and distinct protective structure around said material in the form of a resilient cylindrical waterproof shell.

15. In a pipe covering comprising an insulating covering adapted to surround a pipe, a separate and distinct protective structure, around said insulating covering, in the form of a resilient cylindrical waterproof shell suitably secured therearound.

16. In a pipe covering comprising a non-heat conducting material adapted to entirely surround a pipe, a separate and distinct protective structure around said material in the form of a resilient cylindrical waterproof shell longitudinally separated on one side and adapted to be sprung over said material and suitably secured together therearound.

17. A protective structure for pipe coverings comprising a resilient cylindrical waterproof shell longitudinally separated on one side so as to be sprung over a covering, and means for suitably securing said shell together along the longitudinal separation after it is in place.

18. A pipe covering comprising an insulating material, adapted to entirely surround a pipe, a plurality of independent cylindrical resilient waterproof shells surrounding said pipe covering, so arranged that said shells break joints with each other and said pipe covering. Each of said shells being longitudinally open on one side only and so arranged that said longitudinal openings of separate shells are not in alinement with next adjacent inner shell.

WALTER L. STEFFENS.